US012615641B2

(12) United States Patent
Wang et al.

(10) Patent No.: US 12,615,641 B2
(45) Date of Patent: Apr. 28, 2026

(54) TIME SLOT SCHEDULING METHOD AND DEVICE, AND MEDIUM

(71) Applicant: DATANG MOBILE COMMUNICATIONS EQUIPMENT CO., LTD., Beijing (CN)

(72) Inventors: Lei Wang, Beijing (CN); Meiying Yang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 670 days.

(21) Appl. No.: 17/415,710

(22) PCT Filed: Dec. 3, 2019

(86) PCT No.: PCT/CN2019/122822
§ 371 (c)(1),
(2) Date: Jun. 17, 2021

(87) PCT Pub. No.: WO2020/125409
PCT Pub. Date: Jun. 25, 2020

(65) Prior Publication Data
US 2022/0061082 A1 Feb. 24, 2022

(30) Foreign Application Priority Data
Dec. 20, 2018 (CN) .......................... 201811565144.6

(51) Int. Cl.
*H04W 72/23* (2023.01)
*H04L 5/00* (2006.01)
(52) U.S. Cl.
CPC ........... *H04W 72/23* (2023.01); *H04L 5/0053* (2013.01)

(58) Field of Classification Search
CPC ............................ H04L 5/0053; H04W 72/23
See application file for complete search history.

(56) References Cited

U.S. PATENT DOCUMENTS

| | | | |
|---|---|---|---|
| 10,285,170 B2 * | 5/2019 | Nam ....................... | H04L 5/005 |
| 2017/0208568 A1 * | 7/2017 | Nam ..................... | H04L 5/0094 |

(Continued)

FOREIGN PATENT DOCUMENTS

| | | |
|---|---|---|
| CN | 102917463 A | 2/2013 |
| CN | 106506111 A | 3/2017 |

(Continued)

OTHER PUBLICATIONS

MediaTek Inc., "On 2-stage Downlink Control Information for NR", 3GPP TSG RAN WG1 Meeting #87, Reno, USA, Nov. 14-18, 2016, total 5 pages, R1-1612121.

*Primary Examiner* — Jackie Zuniga Abad
(74) *Attorney, Agent, or Firm* — KILPATRICK TOWNSEND & STOCKTON LLP

(57) ABSTRACT

Disclosed are a time slot scheduling method and device, and a medium, and same are used for relieving the problem in the prior art of the wasting of energy caused by a terminal monitoring, in each time slot, DCI, for scheduling data, in a PDCCH. In the present application, a network side device selects, from scheduling information groups configured for a terminal, at least one scheduling information group used by the terminal; and the network side device instructs, by means of DCI, the terminal to use the at least one scheduling information group to carry out data transmission in one or more time slots. Since the at least one scheduling information group used by the terminal is selected from the plurality of scheduling information groups, and the terminal is instructed, by means of the DCI.

13 Claims, 3 Drawing Sheets

~ 800

Selecting, by a network side device, from a plurality of scheduling information groups configured for a terminal, at least one scheduling information group to be used by the terminal

~ 810

Instructing, by the network side device, via DCI, the terminal to use the at least one scheduling information group to carry out data transmission in one or more time slots

(56) References Cited

U.S. PATENT DOCUMENTS

| | | | | |
|---|---|---|---|---|
| 2019/0261386 A1* | 8/2019 | Li | .......................... | H04W 80/08 |
| 2020/0252928 A1* | 8/2020 | Park | .......................... | H04L 5/00 |
| 2021/0307053 A1* | 9/2021 | Wang | .................... | H04W 72/23 |
| 2021/0314100 A1* | 10/2021 | Yeo | ...................... | H04B 7/0417 |
| 2022/0014314 A1* | 1/2022 | Wang | ......................... | H04L 1/08 |

FOREIGN PATENT DOCUMENTS

| | | | | | |
|---|---|---|---|---|---|
| CN | 108112077 A | 6/2018 | | | |
| CN | 108633052 A | 10/2018 | | | |
| EP | 3179811 A1 | 6/2017 | | | |
| EP | 3637906 A1 * | 4/2020 | ............. | H04B 7/024 |

* cited by examiner

TIME SLOT SCHEDULING METHOD AND DEVICE, AND MEDIUM

The present application is a National Stage of International Application No. PCT/CN2019/122822, filed Dec. 3, 2019, which claims priority to Chinese patent application No. 201811565144.6 filed on Dec. 20, 2018 with Chinese Patent Office, and entitled "Time Slot Scheduling Method and Device", the entire content of which is incorporated herein by reference.

FIELD

The present application relates to the field of communications, in particular to a time slot scheduling method and device, and a medium.

BACKGROUND

In a current system, data transmission scheduling information of a terminal can only be sent through downlink control information (DCI) carried on a physical downlink control channel (PDCCH); and different unicast data of the terminal are scheduled through different DCI, where the DCI needs to be carried via different PDCCH candidates.

The terminal monitors a downlink control channel on all PDCCH candidates on different monitoring occasions (MOs) in a common search space (CSS) or a UE-specific space (USS) on each monitoring time, and detects DCI, for scheduling data, in the downlink control channel, where the DCI includes scheduling information. The terminal determines data transmission in a time slot specified by the DCI according to information such as scheduling time sequence information, time resource distribution and frequency domain resource distribution carried in the DCI. One DCI can only schedule one physical downlink shared channel (PDSCH) or physical uplink shared channel (PUSCH). If the MO is configured to be a search space of each time slot, the terminal needs to monitor downlink control information in each time slot, which increases energy consumption of the terminal.

In conclusion, the terminal in the related art monitors DCI, for scheduling data, in the PDCCH in each time slot, and wasting energy.

SUMMARY

The present application provides a time slot scheduling method and device, and a medium, to solve the problem in the related art of wasting of energy caused by a terminal monitoring, in each time slot, DCI, for scheduling data, in a PDCCH.

In one embodiment, the present application provides a time slot scheduling method, including: selecting, by a network side device, from scheduling information groups configured for a terminal, at least one scheduling information group to be used by the terminal; and instructing, by the network side device, by means of DCI, the terminal to use the at least one scheduling information group to carry out data transmission in one or more time slots.

According to the above method, the network side device selects, from the plurality of scheduling information groups configured for the terminal, the at least one scheduling information group used by the terminal and instructs, by means of the DCI, the terminal to use the at least one scheduling information group to carry out data transmission in the one or more time slots, so that after receiving the at least one scheduling information group, the terminal transmits data in the one or more time slots according to the received at least one scheduling information group, and the terminal may transmit data in time slots through one DCI, without the need to separately detect each time slot, and reducing energy consumption of the terminal.

In a possible implementation, before selecting, by the network side device, from the plurality of scheduling information groups configured for the terminal, the at least one scheduling information group to be used by the terminal, the network side device configures a first corresponding relationship between scheduling information groups and scheduling information group indexes for the terminal through high-level signaling; when the network side device instructs, via the DCI, the terminal to use the at least one scheduling information group to carry out data transmission in the one or more time slots, the network side device determines the scheduling information group index, corresponding to the scheduling information group, needing to be sent to the terminal according to the first corresponding relationship; and the network side device sends the determined scheduling information group index to the terminal via the DCI.

In a possible implementation, the scheduling information group in the first corresponding relationship configured for the terminal by the network side device through the high-level signaling includes: a scheduling information group containing all scheduling information; a scheduling information group containing part of the scheduling information; and a scheduling information group not containing the scheduling information.

In a possible implementation, if the scheduling information group contains part of the scheduling information, remaining scheduling information is pre-defined, or remaining scheduling information is configured in a semi-static manner for the terminal by the network side device through the high-level signaling, or remaining scheduling information is configured dynamically for the terminal by the network side device through physical-layer signaling.

In a possible implementation, when the network side device instructs, via the DCI, the terminal to use the at least one scheduling information group to carry out data transmission in the one or more time slots, the network side device determines a position index, in the DCI, of a scheduling indication information domain corresponding to a time slot needing to be scheduled according to a second corresponding relationship between position indexes of scheduling indication information domains in the DCI and time slots; and the network side device sends the scheduling information group index corresponding to the time slot to the terminal through the corresponding scheduling indication information domain in the DCI according to the determined position index.

In a possible implementation, before instructing, by the network side device, via the DCI, the terminal to use the at least one scheduling information group to carry out data transmission, the network side device configures the second corresponding relationship between position indexes of scheduling indication information domains in the DCI and time slots for the terminal through the high-level signaling.

In a possible implementation, the method further includes: determining, by the network side device, a length of the scheduling indication information domain according to the number of the scheduling information groups configured for the terminal.

In a possible implementation, when instructing, by the network side device, by means of the DCI, the terminal to use the at least one scheduling information group to carry out data transmission in the one or more time slots: if the scheduling information group configured for the terminal contains all the scheduling information, the network side device directly schedules the scheduling information group carried by the scheduling indication information domain corresponding to the time slot by means of the DCI; or if the scheduling information group configured for the terminal contains part of the scheduling information, the network side device performs scheduling via the scheduling information group carried by the scheduling indication information domain corresponding to the time slot configured for the terminal in the DCI and the remaining scheduling information configured for the terminal through the high-level signaling; or if the scheduling information group configured for the terminal contains part of the scheduling information, the network side device performs scheduling via the scheduling information group carried by the scheduling indication information domain corresponding to the time slot configured for the terminal in the DCI and the remaining scheduling information dynamically indicated in the DCI.

In a possible implementation, the network side device notifies the terminal that the payload size of the DCI used for the scheduling information group is the same as that of a DCI format 0-0, or a DCI format 1-0, or a DCI format 0-1 or a DCI format 1-1; or the network side device notifies the terminal that the payload size of the DCI used for the scheduling information group is configured for the terminal by the network side device through the high-level signaling.

In a possible implementation, the network side device notifies the terminal that the received DCI is DCI configured to schedule data transmission in time slots through at least one of the following manners: the network side device scrambles the DCI configured to schedule data transmission in the plurality of time slots through a first RNTI (Radio Network Temporary Identity); the network side device carries information configured to represent a DCI type in the DCI configured to schedule data transmission in the plurality of time slots; the network side device sends the DCI configured to schedule data transmission in the plurality of time slots in a specific search space; the network side device carries information configured to represent the DCI type on frozen bits; or the network side device sets part of bits in the DCI configured to schedule data transmission in the plurality of time slots to be predetermined values.

In one embodiment of the present application provides a time slot scheduling method, including: receiving, by a terminal, at least one scheduling information group instructed by a network side device for the terminal via DCI; and carrying out data transmission in one or more time slots by using the at least one scheduling information group; where the at least one scheduling information group is selected, from scheduling information groups configured for the terminal, by the network side device.

According to the above method, after the terminal receives the at least one scheduling information group, the terminal carries out data transmission in the one or more time slots according to the received at least one scheduling information group, and the terminal can carry out data transmission in time slots by means of one DCI, without the need to separately detect a downlink control channel in each time slot, and reducing energy consumption of the terminal.

In a possible implementation, before receiving, by the terminal, the at least one scheduling information group instructed by the network side device for the terminal via the DCI, the terminal receives a first corresponding relationship, carried by high-level signaling, between scheduling information groups configured by the network side device and scheduling information group indexes; and when the terminal receives the at least one scheduling information group instructed by the network side device for the terminal via the DCI, the terminal receives a scheduling information group index sent by the network side device by means of the DCI; where the scheduling information group index is a scheduling information group index, determined by the network side device according to the first corresponding relationship and needing to be sent to the terminal, corresponding to the scheduling information group.

In a possible implementation, the scheduling information group in the first corresponding relationship, carried by the high-level signaling and received by the terminal, between scheduling information groups configured by the network side device and scheduling information group indexes includes: a scheduling information group containing all scheduling information; a scheduling information group containing part of the scheduling information; and a scheduling information group not containing the scheduling information.

In a possible implementation, if the scheduling information group contains part of the scheduling information, remaining scheduling information is pre-defined, or remaining scheduling information is configured in a semi-static manner for the terminal by the network side device through the high-level signaling, or remaining scheduling information is configured dynamically for the terminal by the network side device through physical-layer signaling.

In a possible implementation, when the terminal receives the at least one scheduling information group instructed by the network side device for the terminal via the DCI, the terminal obtains the scheduling information group index, corresponding to the time slot, sent by the network side device through a scheduling indication information domain, in the DCI, corresponding to the time slot.

The scheduling indication information domain is determined by the network side device according to a position index, in the DCI, of the scheduling indication information domain corresponding to the time slot needing to be scheduled in a second corresponding relationship between position indexes of scheduling indication information domains in the DCI and time slots.

In a possible implementation, before receiving, by the terminal, the at least one scheduling information group instructed by the network side device for the terminal via the DCI, the terminal receives a second corresponding relationship, carried by the high-level signaling and configured for the terminal by the network side device, between position indexes of scheduling indication information domains in the DCI and time slots.

In a possible implementation, a payload size, notified by the network side device and received by the terminal, of the DCI used for the scheduling information group is the same as that of a DCI format 0-0, or a DCI format 1-0, or a DCI format 0-1 or a DCI format 1-1; or the payload size, notified by the network side device and received by the terminal, of the DCI used for the scheduling information group is configured for the terminal by the network side device through the high-level signaling.

In a possible implementation, the terminal determines that the DCI sent by the network side device is DCI configured to schedule data transmission in time slots through at least one of the following manners: the terminal determines that the DCI sent by the network side device is DCI scrambled through a first RNTI; the terminal determines that the DCI sent by the network side device carries information configured to represent a DCI type; the terminal receives the DCI configured to schedule data transmission in the plurality of time slots in a specific search space; the terminal determines that the DCI sent by the network side device carries information configured to represent the DCI type on frozen bits; or the terminal determines that part of bits in the DCI sent by the network side device are predetermined values.

In one embodiment of the present application provides a time slot scheduling device, including a processor, a memory and a transceiver; and the processor is configured to read a program in the memory and execute: selecting, from scheduling information groups configured for a terminal, at least one scheduling information group to be used by the terminal; and instructing, via DCI, the terminal to use the at least one scheduling information group to carry out data transmission in one or more time slots.

In one embodiment of the present application provides a time slot scheduling device, including a processor, a memory and a transceiver; the processor is configured to read a program in the memory and execute: receiving at least one scheduling information group instructed by a network side device for the terminal via the DCI; and carrying out data transmission in one or more time slots by using the at least one scheduling information group.

The at least one scheduling information group is selected, from scheduling information groups configured for the terminal, by the network side device.

In one embodiment of the present application provides a time slot scheduling device, including: a selecting device, configured to select, from scheduling information groups configured for a terminal, at least one scheduling information group to be used by the terminal; and an instructing device, configured to instruct, by means of DCI, the terminal to use the at least one scheduling information group to carry out data transmission in one or more time slots.

In one embodiment of the present application provides a time slot scheduling device, including: a receiving device, configured to receive at least one scheduling information group instructed by a network side device for the terminal via the DCI; and a transmitting device, configured to use the at least one scheduling information group to carry out data transmission in one or more time slots; where the at least one scheduling information group is selected, from scheduling information groups configured for a terminal, by the network side device.

In one embodiment of the present application further provides a computer readable storage medium, storing a computer program thereon, where steps of any time slot scheduling method are implemented when the program is executed by a processor.

BRIEF DESCRIPTION OF THE DRAWINGS

In order to explain the embodiments of the present application more clearly, the following contents will briefly introduce the drawings that need to be used in the description of the embodiments. Apparently, the drawings in the following description are only some embodiments of the present application.

6

Figure 4:
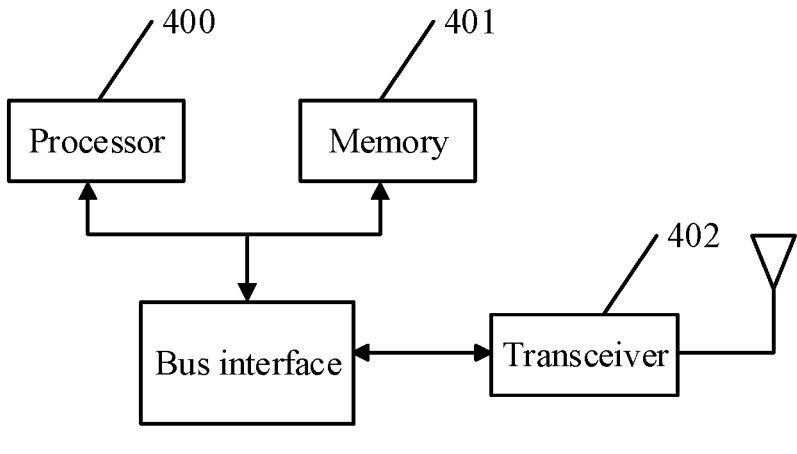

FIG. 4 is a structural diagram of a first time slot scheduling device provided by an embodiment of the present application.

Figure 5:
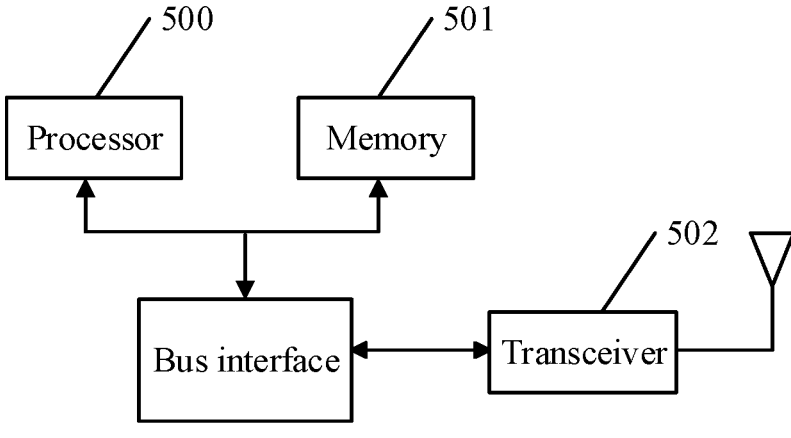

FIG. 5 is a structural diagram of a second time slot scheduling device provided by an embodiment of the present application.

Figure 6:
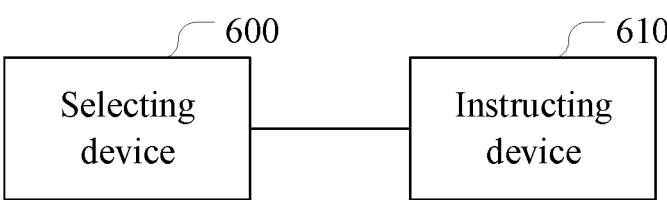

FIG. 6 is a structural diagram of a third time slot scheduling device provided by an embodiment of the present application.

Figure 7:
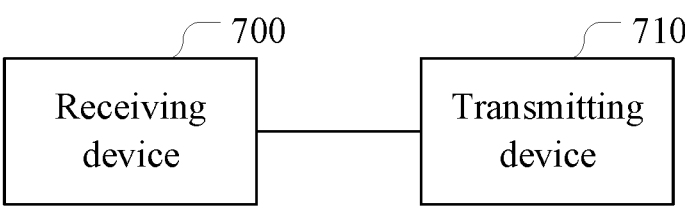

FIG. 7 is a structural diagram of a fourth time slot scheduling device provided by an embodiment of the present application.

Figure 8:
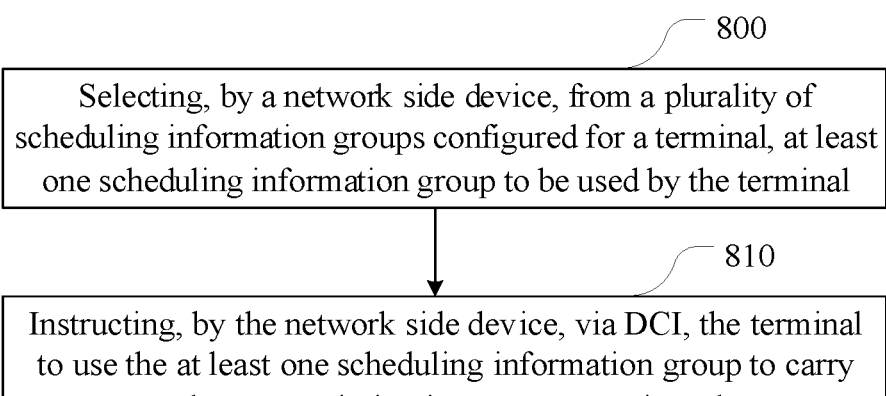

FIG. 8 is a flow diagram of a first time slot scheduling method provided by an embodiment of the present application.

Figure 9:
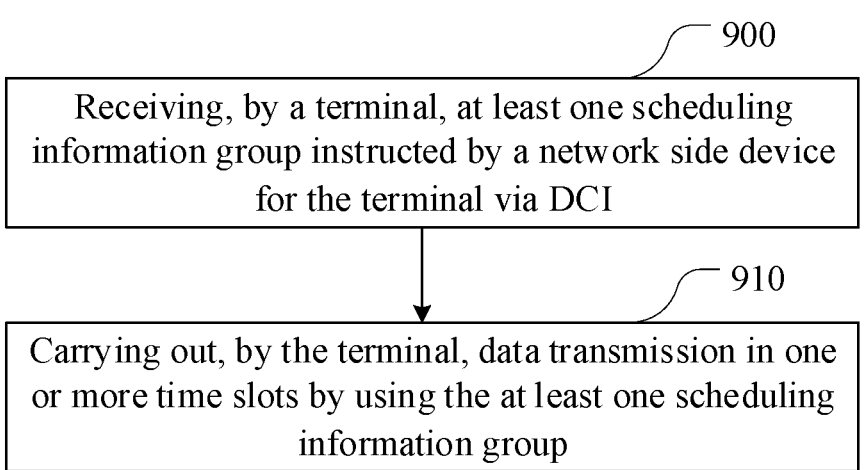

FIG. 9 is a flow diagram of a second time slot scheduling method provided by an embodiment of the present application.

DETAILED DESCRIPTION OF THE EMBODIMENTS (1) In the embodiments of the present application, nouns "network" and "system" are often alternately used.

(2) The term "a plurality of" in the embodiments of the present application means two or more, and other quantifiers are similar to it.

(3) "And/or" describes an association relationship of associated objects, which means that there can be three kinds of relationships, for example, A and/or B can mean that there are three kinds of situations: A alone, A and B, and B alone. The character "/" generally indicates that associated objects are in an "or" relationship.

The network architecture and business scenarios described in the embodiments of the present application are to more clearly illustrate the embodiments of the present application, and do not limit by the embodiments of the present application. The evolution of the network architecture and the emergence of new business scenarios, provided by the embodiments of the present application are also applicable to similar embodiments.

A terminal sends or receives data according to scheduling information in a time slot. The scheduling information in the corresponding time slot is sent by a network side device by means of DCI carried on a PDCCH. Different scheduling information is scheduled through different DCI, and each piece of DCI can only schedule one scheduling information group; and the terminal needs to monitor a downlink control channel in different time slots, and wasting energy of the terminal.

An embodiment of the present application provides a time slot scheduling method for the above scenario. A network side device instructs, by means of DCI, a terminal to transmit data according to a scheduling information group in one or more time slots. Thus, only one downlink control channel needs to be monitored, without the need to separately detect the downlink control channel in each time slot, and reducing energy consumption of the terminal.

The terminal is a device with a wireless communication function, and may be deployed on the land, including being deployed indoors or outdoors, and being handheld or vehicle-mounted, may be deployed on water surfaces (e.g., ships), and may be further deployed in the air (e.g., on airplanes, balloons and satellites). The terminal may be a mobile phone, a pad, a computer with a wireless receiving and sending function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home and the like. The terminal may also be various forms of UE, mobile stations (MS) and terminal devices.

The network side device is a device providing a wireless communication function for the terminal, including but not limited to: a gNB in 5G, a radio network controller (RNC), a node B (NB), a base station controller (BSC), a base transceiver station (BTS), a home base station (e.g., a home evolved node B or a home node B (HNB)), a baseband unit (BBU), a transmitting and receiving point (TRP), a transmitting point (TP), a mobile switching center and the like. The base station in the present application may further be a device providing the wireless communication function for the terminal in other communication systems that may appear in the future.

The present application will be further described in detail in combination with the attached drawings below. Apparently, the described embodiments are only part of the embodiments of the present application, not all of them.

Figure 1:
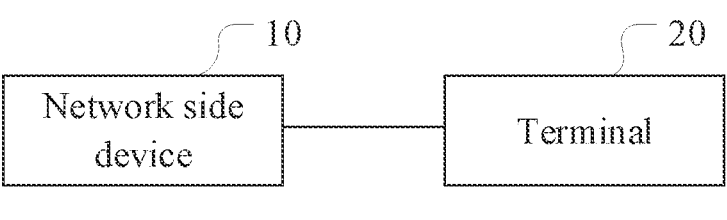
FIG. 1 is a structural diagram of a system for time slot scheduling provided by an embodiment of the present application.

For the above scenario, a schematic structural diagram of a system for time slot scheduling provided by the present application is specifically shown in FIG. 1. The system includes a network side device 10 and a terminal 20.

A network side device 10 is configured to select, from scheduling information groups configured for a terminal, at least one scheduling information group to be used by the terminal; and instruct, by means of DCI, the terminal to use the at least one scheduling information group to carry out data transmission in one or more time slots.

The terminal 20 is configured to receive the at least one scheduling information group instructed by the network side device for the terminal 20 by means of the DCI; and carry out data transmission in one or more time slots by using the at least one scheduling information group.

The at least one scheduling information group is selected by the network side device from the plurality of scheduling information groups configured for the terminal.

In the embodiments of the present application, the network side device selects, from the plurality of scheduling information groups configured for the terminal, the at least one scheduling information group to be used by the terminal, and instructs, by means of the DCI, the terminal to use the at least one scheduling information group to carry out data transmission in the one or more time slots, so that after receiving the at least one scheduling information group, the terminal transmits data in the one or more time slots according to the received at least one scheduling information group, the terminal may transmit data in time slots through one DCI, without the need to separately detect a downlink control channel in each time slot, and reducing energy consumption of the terminal.

Before selecting, from the plurality of scheduling information groups, the at least one scheduling information group to be used by the terminal, the network side device needs to configure the scheduling information groups for the terminal.

Configuration of the scheduling information groups for the terminal by the network side device is mainly to configure a first corresponding relationship between the plurality of scheduling information groups and scheduling information group indexes for the terminal in advance through high-level signaling.

The high-level signaling may be radio resource control (RRC) signaling.

In one embodiment, the scheduling information groups in the first corresponding relationship configured for the terminal by the network side device through the high-level signaling include: scheduling information groups containing all scheduling information; scheduling information groups containing part of the scheduling information; and scheduling information groups not containing the scheduling information.

The scheduling information includes the following categories: time-frequency domain resource distribution, a modulation and coding scheme (MCS), relevant configurations of antenna ports, a hybrid automatic report reQuest (HARQ) ID, etc.

When the network side device configures the plurality of different scheduling information groups for the terminal, the plurality of scheduling information groups configured for the terminal may all be the scheduling information groups containing all the scheduling information; or the plurality of scheduling information groups configured for the terminal may all be the scheduling information groups containing part of the scheduling information; or the plurality of scheduling information groups configured for the terminal are partly the scheduling information groups containing all the scheduling information, and partly the scheduling information groups not containing the scheduling information; or the plurality of scheduling information groups configured for the terminal are partly the scheduling information groups containing part of the scheduling information, and partly the scheduling information groups not containing the scheduling information; or the plurality of scheduling information groups configured for the terminal are partly the scheduling information groups containing all the scheduling information, partly the scheduling information groups containing part of the scheduling information, and partly the scheduling information groups not containing the scheduling information. There may be multiple possible situations, which are not repeated here. The situation is mainly decided according to specific configurations of the network side device.

In the embodiment of the present application, the scheduling information group indexes are mainly decided by the length of scheduling indication information domains in the DCI where the scheduling information groups are located. For example, the length of the scheduling indication information domains is 4 bits, and then the scheduling information group index may be any one of 0000 to 1111.

The length of the scheduling indication information domains in the DCI is determined by the number of the scheduling information groups configured for the terminal by the network side device.

In one embodiment, the network side device determines the length of the scheduling indication information domains according to a formula $\mathrm{ceil}(\log 2(C))$ bits or $\mathrm{ceil}(\log 2(C+1))$ bits, where C represents the number of the scheduling information groups configured for the terminal by the network side device.

It needs to be noted that an extra state in $\mathrm{ceil}(\log 2(C+1))$ bits is configured to instruct that the terminal is not scheduled.

Further, the scheduling information group indexes of the scheduling information groups configured for the terminal by the network side device are determined according to the length of the scheduling indication information domains.

For example, the network side device configures eight scheduling information groups for the terminal and the eight scheduling information groups all are the scheduling information groups containing all the scheduling information. At the moment, the length of the scheduling indication information domain is determined to be 4 bits by the network side device according to the formula ceil(log 2(C+1)) bits, and then the scheduling information group indexes are 0000, 0001, 0010, 0011, . . . , 1111.

If the eight scheduling information groups are respectively the scheduling information groups 1-8 containing all the scheduling information, and the scheduling information group indexes corresponding to the scheduling information groups 1-8 containing all the scheduling information are respectively: 0000 to 0111, the index corresponding to the extra state is 1000; specifically, the corresponding relationship between scheduling information groups and scheduling information group indexes is as shown in Table 1.

The network side device sends the first corresponding relationship between scheduling information groups and scheduling information group indexes to the terminal according to the corresponding relationship in Table 1.

TABLE 1

| Corresponding relationship between scheduling information groups and scheduling information group indexes | |
| --- | --- |
| Combination index (scheduling information group index) | Scheduling information (scheduling information group) |
| 0000 | Scheduling information group 1 containing all scheduling information |
| 0001 | Scheduling information group 2 containing all scheduling information |
| 0010 | Scheduling information group 3 containing all scheduling information |
| 0011 | Scheduling information group 4 containing all scheduling information |
| 0100 | Scheduling information group 5 containing all scheduling information |
| 0101 | Scheduling information group 6 containing all scheduling information |
| 0110 | Scheduling information group 7 containing all scheduling information |
| 0111 | Scheduling information group 8 containing all scheduling information |
| 1000 | Terminal is not scheduled in the time slot |
| 1001 to 1111 | Reserved (reserved position) |

It needs to be noted that when the network side device sends the first corresponding relationship to the terminal, it is not necessarily performed in the form shown in the table, and the corresponding relationship may be directly sent or sent in other forms, which are not repeated here.

Correspondingly, the terminal receives the first corresponding relationship, carried by the high-level signaling, between scheduling information groups and scheduling information group indexes configured by the network side device.

During implementation, the network side device configures the corresponding relationship between scheduling information groups and scheduling information group indexes for the terminal, so that when the terminal is scheduled via the scheduling information group indexes carried in the scheduling indication information domain in the DCI, the terminal may determine the scheduling information groups corresponding to the scheduling information group indexes according to the corresponding relationship and send or receive data based on the determined scheduling information groups.

In the embodiment of the present application, when the network side device determines the length of the scheduling indication information domain in the DCI according to the number of the scheduling information groups configured for the terminal:

if the scheduling information groups configured by the network side device through the high-level signaling all are the scheduling information groups containing all the scheduling information, the network side device determines the length of the scheduling indication information domain through ceil(log 2(C)) bits or ceil(log 2(C+1)) bits directly according to the number of the scheduling information groups configured for the terminal by the network side device; or if the scheduling information groups configured for the terminal by the network side device all are the scheduling information groups containing part of the scheduling information, scheduling information contained in each of the scheduling information groups configured for the terminal by the network side device is different in category; or the scheduling information contained in each scheduling information group is the same in category, but scheduling information contents corresponding to the scheduling information categories are different.

When the plurality of scheduling information groups are the scheduling information groups containing part of the scheduling information and the scheduling information in the scheduling information groups is different in category, the length of the scheduling indication information domain in the DCI is determined directly according to the number of the scheduling information groups configured for the terminal by the network side device.

When the plurality of configured scheduling information groups are the scheduling information groups containing part of the scheduling information and the scheduling information in each scheduling information group is the same in category, the network side device may configure scheduling information categories for the terminal and configure different information for each scheduling information category. Thus, the network side device may determine the number of the scheduling information groups according to the configured different information of the plurality of information categories, and then determine the length of the scheduling indication information domain according to the number of the scheduling information groups, and the length of the scheduling indication information domain may also be determined directly according to the number of the scheduling information groups configured for the terminal.

For example, the network side device configures two kinds of time-frequency domain resource distribution and four HARQ processes for the terminal through the high-level signaling. At the moment, it is determined that the network side device configures eight scheduling information groups containing part of the scheduling information for the terminal, and then the length of the scheduling indication information domain is determined according to the formula ceil(log 2(C)) bits or ceil(log 2(C+1)) bits.

During implementation, the length of the scheduling indication information domain in the DCI may be accurately determined according to the number of the configured scheduling information groups.

In one embodiment, if the scheduling information groups contain part of the scheduling information, remaining scheduling information is pre-defined; or the remaining scheduling information is configured in a semi-static manner for the terminal by the network side device through the high-level signaling; or the remaining scheduling information is configured dynamically for the terminal by the network side device through physical-layer signaling.

For example, the scheduling information groups configured for the terminal by the network side device through the high-level signaling all are the scheduling information groups containing part of the scheduling information, and the scheduling information groups contain three scheduling information categories, namely time-frequency domain resource distribution, an MCS and relevant configurations of antenna ports, then the remaining scheduling information HARQ ID may be configured for the terminal through a pre-defined manner or uniformly configured for the terminal through the high-level signaling, or dynamically indicated through bit domains in the DCI. At the moment, the DCI may carry two types of scheduling indication information domains, namely scheduling indication information configured by the high-level signaling and dynamic indication information domains related to time slots.

The dynamically configured scheduling information is not configured by the high-level signaling in advance and can only be configured through the physical-layer signaling, and the dynamically configured scheduling information is valid to one or more time slots corresponding to the scheduling indication information domains in the DCI.

In one embodiment, instructing, by means of the DCI, the terminal to use the at least one scheduling information group to carry out data transmission in the one or more time slots by the network side device includes:

if the scheduling information groups configured for the terminal contain all the scheduling information, the network side device directly schedules the scheduling information groups carried by the scheduling indication information domains corresponding to the time slots by means of the DCI; or if the scheduling information groups configured for the terminal contain part of the scheduling information, the network side device performs scheduling via the scheduling information groups carried by the scheduling indication information domains corresponding to the time slots configured for the terminal in the DCI and the remaining scheduling information configured for the terminal through the high-level signaling; or if the scheduling information groups configured for the terminal contain part of the scheduling information, the network side device performs scheduling via the scheduling information groups carried by the scheduling indication information domains corresponding to the time slots configured for the terminal in the DCI and the remaining scheduling information dynamically indicated in the DCI.

In one embodiment, when the network side device configures the scheduling information groups for the terminal, the scheduling information contained in the plurality of configured scheduling information groups is different, that is, the network side device configures the plurality of different scheduling information groups for the terminal.

The plurality of scheduling information groups configured for the terminal by the network side device all being the scheduling information groups containing all the scheduling information is taken as an example.

For example, if the eight scheduling information groups configured for the terminal by the network side device all are the scheduling information groups containing all the scheduling information, and each scheduling information group contains scheduling information group categories such as frequency domain resource distribution, time domain resource distribution, an MCS, HARQ-related information, multiple-input multiple-output (MIMO) related information, etc., the scheduling information contained in the different scheduling information groups is the same in category, but scheduling information contents corresponding to the scheduling information categories are different.

The scheduling information group 1 includes all the scheduling information, and in the scheduling information group 1, a frequency domain resource is FRA1, a time domain resource is TRA1, an MCS is MCS1, an HARQ process ID is equal to 1, and an antenna port used for transmission is AP1.

The scheduling information group 2 includes all the scheduling information, and in the scheduling information group 2, a frequency domain resource is FRA2, a time domain resource is TRA2, an MCS is MCS2, an HARQ process ID is equal to 2, and an antenna port used for transmission is AP2; and so on.

The plurality of scheduling information groups configured for the terminal by the network side device all being the scheduling information groups containing part of the scheduling information is taken as an example.

If the network side device configures eight scheduling information groups for the terminal and the eight scheduling information groups all are the scheduling information groups containing part of the scheduling information, each scheduling information group needs to contain different scheduling information categories; or the scheduling information contained in each scheduling information group is the same in category, but scheduling information contents corresponding to the scheduling information categories are different.

In one embodiment, if the scheduling information groups containing part of the scheduling information contain the same category of scheduling information, the network side device may configure the scheduling information contents corresponding to each category of scheduling information through the high-level signaling. For example, the network side device configures two kinds of time-frequency domain resource distribution and four HARQ processes through the high-level signaling; at the moment, it is determined that the network side device configures eight scheduling information groups containing part of the scheduling information for the terminal, and each scheduling information group containing part of the scheduling information is a combination of one kind of time-frequency domain resource distribution and one HARQ process.

For example, the two kinds of time-frequency domain resource distribution are {RA1, RA2}, the four HARQ processes are {HARQ process 1, HARQ process 2, HARQ process 3, HARQ process 4}; and it is determined that the eight scheduling information groups configured by the network side device are respectively {RA1, HARQ process 1}, {RA1, HARQ process2}, {RA1, HARQ process 3}, {RA1, HARQ process 4}, {RA2, HARQ process 1}, {RA2, HARQ process 2}, {RA2, HARQ process 3} and {RA2, HARQ process 4}.

If the scheduling information groups containing part of the scheduling information contain the scheduling information with different categories, the network side device separately configures the scheduling information for each scheduling information group. For example, four scheduling information groups are configured, which are respectively {RA2, MCS1}, {RA2, HARQ process 4}, {MCS1, HARQ process 4} and {antenna port 1, HARQ process 4}, and all are directly configured at the network side device.

It needs to be noted that the network side device may configure any scheduling information combination for the terminal, which is not limited to the above scheduling information groups.

For example, the network side device configures two kinds of time-frequency resource distribution, four HARQ processes, a new data indicator (NDI) related to retransmission, a Redundant Version (RV), etc. for the terminal through the high-level signaling.

In one embodiment, the plurality of scheduling information groups configured for the terminal by the network side device are different scheduling information groups, and the configuration number is not limited.

For example, the number of the different scheduling information groups configured by the network side device through RRC Signaling may be greater than or equal to or less than the number of time slots scheduled via the same DCI.

If the plurality of scheduling information groups configured for the terminal by the network side device include the scheduling information groups not containing the scheduling information, the scheduling information groups not containing the scheduling information indicate that there is no data channel to schedule in the time slot corresponding to the scheduling indication information domain, corresponding to the scheduling information groups not containing the scheduling information, in the DCI.

Correspondingly, when the terminal determines that there is no data channel to schedule in the time slots, the downlink control channel is not monitored in the time slot or time slots.

When the network side device configures the first corresponding relationship between scheduling information groups and scheduling information group indexes for the terminal through the high-level signaling, the network side device further configures a second corresponding relationship between position indexes of the scheduling indication information domains in the DCI and time slots for the terminal through the high-level signaling.

The position index 1 corresponds to the first scheduling indication information domain in the DCI, the position index 2 corresponds to the second scheduling indication information domain in the DCI, and so on.

When the network side device configures the second corresponding relationship between position indexes of the scheduling indication information domains in the DCI and time slots for the terminal, the network side device may directly notify the terminal the corresponding relationship between position indexes of the scheduling indication information domains in the DCI and time slots to make the terminal determine the position indexes of the scheduling indication information domains corresponding to the time slots in the DCI according to the received second corresponding relationship.

In one embodiment, the network side device notifies the terminal the position indexes of the scheduling indication information domains in the DCI to make the terminal determine the position indexes of the scheduling indication information domains corresponding to the time slots in the DCI according to a pre-defined manner.

For example, each scheduling indication information domain determines the corresponding time slot according to an ascending order, that is, the first scheduling indication information domain in the DCI corresponds to the first time slot between two MOs, the second scheduling indication information domain in the DCI corresponds to the second time slot, and so on.

In one embodiment, the time slot corresponding to each scheduling indication information domain is determined according to the formula i+floor (M/N), where M is the number of the interval time slots between the two MOs, N is the number of the scheduling indication information domains contained in the DCI, and then the time slot corresponding to the $i^{th}$ scheduling indication information domain in the DCI is i+floor (M/N), where M and N are both positive integers greater than 1.

The corresponding terminal receives the second corresponding relationship, configured by the network side device through the high-level signaling, between position indexes of the scheduling indication information domains in the DCI and time slots, and determines the position indexes of the scheduling indication information domains corresponding to the time slots in the DCI according to the second corresponding relationship.

When the network side device instructs, by means of the DCI, the terminal to use the at least one scheduling information group to carry out data transmission in the one or more time slots, the network side device determines the position indexes, in the DCI, of the scheduling indication information domains corresponding to the time slots needing to be scheduled according to the second corresponding relationship between position indexes of the scheduling indication information domains in the DCI and time slots; and the network side device sends the scheduling information group indexes corresponding to the time slots to the terminal through the corresponding scheduling indication information domains in the DCI according to the determined position indexes.

Correspondingly, when the terminal receives the at least one scheduling information group instructed by the network side device for the terminal via the DCI, the terminal receives the scheduling information group indexes, corresponding to the time slots, sent by the network side device through the scheduling indication information domains, in the DCI, corresponding to the time slots.

The scheduling indication information domains are determined by the network side device according to the position indexes, in the DCI, of the scheduling indication information domains corresponding to the time slots needing to be scheduled in the second corresponding relationship between position indexes of the scheduling indication information domains in the DCI and time slots.

The corresponding scheduling information groups may be determined further according to the scheduling information group indexes carried in the scheduling indication information domains, and data are sent or received in the time slots according to the scheduling information in the corresponding scheduling information groups.

Figure 2:
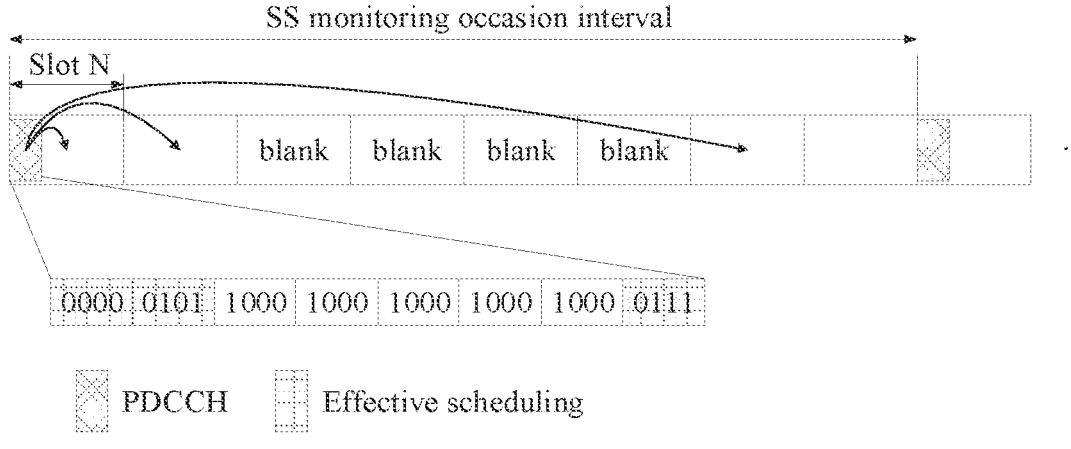
FIG. 2 is a schematic diagram of determining data transmission in a time slot according to DCI by a first terminal provided by an embodiment of the present application.

Assuming that the position index of the scheduling indication information domain configured for the terminal by a base station in the time slot N is 1, that is, after the terminal receives the DCI for scheduling time slots, the scheduling information group is determined according to the first scheduling indication information domain in the DCI. As shown in FIG. 2, after the terminal monitors the PDCCH in the first time slot between the two adjacent MOs and determines the DCI in the PDCCH, the scheduling information group index in the first scheduling indication information domain in the DCI is determined. For example, the scheduling information group index in the first scheduling indication information domain is 0000, and then the terminal determines to transmit data in the time slot N through the scheduling information group containing all the scheduling information according to the first corresponding relationship configured for the terminal through the high-level signaling. If the scheduling information group index in the first scheduling indication information domain is 1000, then it is illustrated that the terminal is not scheduled in the time slot N, and the terminal neither sends nor receives data, and will not monitor other downlink control channels.

Figure 3:
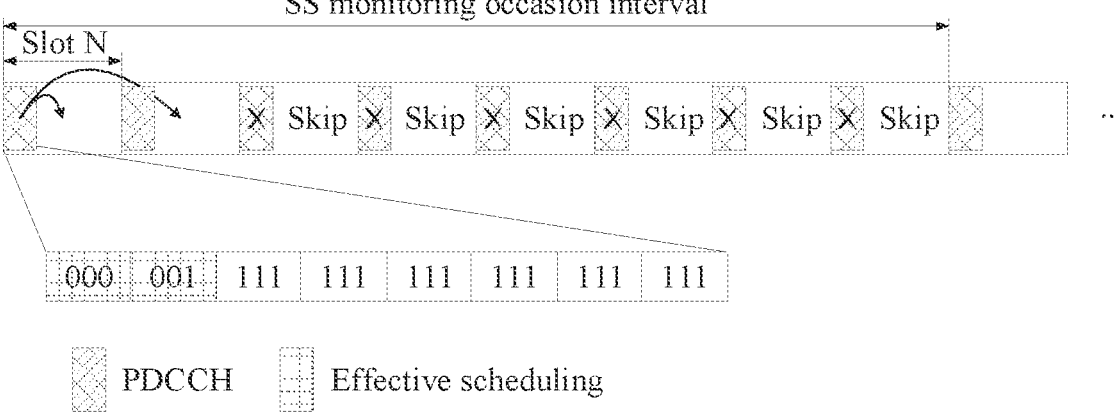
FIG. 3 is a schematic diagram of determining data transmission in a time slot according to DCI by a second terminal provided by an embodiment of the present application.

The length of each scheduling indication information domain in the DCI carrying a scheduling information group of the terminal and transmitted in a common search space or a UE-specific space is determined based on the number of the scheduling information groups configured for the terminal by the network side device. If the network side device configures seven scheduling information groups for the terminal, the length of each scheduling indication information domain in the DCI is 3 bits. When the network side device indicates that the network side device does not have configured scheduling information group indexes or indexes for reserved positions through the scheduling information group indexes in the scheduling indication information domains, it is identified that the terminal is not scheduled at the moment, as shown in FIG. 3.

In one embodiment, when the network side device instructs, by means of the DCI, the terminal to use the scheduling information groups to carry out data transmission in the time slots, that is, the network side device notifies the terminal the scheduling information groups, and the used DCI is a currently defined DCI format or a newly defined DCI format.

If the DCI is the newly defined DCI format, the payload size of the newly defined DCI format is the same as that of a DCI format 0-0, or a DCI format 1-0, or a DCI format 0-1 or a DCI format 1-1.

In one embodiment, when the network side device notifies the terminal that the DCI used for the scheduling information groups is the newly defined DCI format, the payload size of the newly defined DCI format is configured for the terminal by the network side device through the high-level signaling.

Correspondingly, the payload size, notified by the network side device and received by the terminal, of the DCI used for the scheduling information groups is the same as that of the DCI format 0-0, or the DCI format 1-0, or the DCI format 0-1 or the DCI format 1-1.

In one embodiment, the payload size, notified by the network side device and received by the terminal, of the DCI used for the scheduling information groups is configured for the terminal by the network side device through the high-level signaling.

For example, the DCI is transmitted in USS and the size of DCI transmitted in other USSs is 31 bits, and then the payload size of the newly defined DCI format X is also 31 bits.

In one embodiment, the network side device notifies the terminal that the received DCI is the DCI configured to schedule data transmission in time slots, namely the DCI is the newly defined DCI format, through at least one of the following manners.

Manner I: the network side device scrambles the DCI configured to schedule data transmission in the plurality of time slots through a first RNTI.

In one embodiment, when CRC added to the DCI is scrambled by using the first RNTI, the DCI includes information domains for scheduling terminals, and each information domain is combined with scheduling information combinations configured by the high-level signaling to schedule data transmission in a specific slot.

The first RNTI is an RNTI configured to scramble the DCI for scheduling data transmission in the plurality of time slots and newly defined other than an existing protocol.

Manner II: the network side device carries information representing a DCI type in the DCI configured to schedule data transmission in the plurality of time slots.

An explicit indication domain for indicating a DCI application scenario is added into the currently defined DCI format, which indicates a specific purpose of the DCI. For example, 1-bit information domain is introduced, 0 represents that the DCI is used for conventional scheduling, and 1 represents that the DCI is configured to schedule data transmission in slots.

Manner III: the network side device sends the DCI configured to schedule data transmission in the plurality of time slots in a specific search space.

When the DCI is transmitted in certain search spaces, e.g. the DCI format 0-0 or the DCI format 1-0 configured by the high-level signaling is transmitted in spaces with specific search space numbers, the DCI is configured to schedule data transmission of a group of terminals, and each information domain is combined with the scheduling information combinations configured by the high-level signaling to schedule data transmission of specific terminals.

Manner IV: the network side device carries information representing a DCI type on frozen bits.

When information carried on the frozen bits after polar encoding of the DCI indicates that the DCI contains information domains for scheduling the plurality of slots, each information domain is combined with the scheduling information combinations configured by the high-level signaling to schedule data transmission in a specific slot.

Manner V: the network side device sets part of bits in the DCI configured to schedule data transmission in the plurality of time slots to be predetermined values.

When certain information domains in the DCI are set to be invalid values, the DCI contains the information domains for scheduling the plurality of slots, and each information domain is combined with the scheduling information combinations configured by the high-level signaling to be configured to schedule data transmission in a specific slot. For example, an RA domain is set to be all 1, and remaining bits are used for multi-slots scheduling.

Correspondingly, the terminal determines that the DCI sent by the network side device is the DCI configured to schedule data transmission in the plurality of time slots through at least one of the following manners:

the terminal determines that the DCI sent by the network side device is DCI scrambled through the first RNTI;

the terminal determines that the DCI sent by the network side device carries information representing a DCI type;

the terminal determines that the DCI sent by the network side device carries information representing a DCI type on the frozen bits; the terminal receives the DCI configured to schedule data transmission in the plurality of time slots in a specific search space; or the terminal determines that part of bits in the DCI sent by the network side device are predetermined values.

During implementation, the determining methods for the newly defined DCI format are given, when the network side device uses the above DCI to carry the scheduling information groups, the terminal determines that the DCI sent by the network side device is the DCI configured to schedule data transmission in the plurality of time slots according to the above methods at the same time, and how many slots carry out uplink data sending or downlink data receiving may be accurately determined.

It needs to be noted that the time slot scheduling method provided by the embodiment of the present application is not only configured to schedule uplink data, but also configured to schedule downlink data.

As shown in FIG. 4, a first time slot scheduling device of embodiments of the present application is provided. The device includes a processor 400, a memory 401 and a transceiver 402.

The processor 400 is responsible for managing a bus architecture and general processing. The memory 401 stores data used when the processor 400 executes operations. The transceiver 402 is configured to receive and send data under the control of the processor 400.

The bus architecture may include interconnected buses of any number and bridges of any number, which are specifically linked together through various circuits of one or more processors represented by the processor 400 and various circuits of memories represented by the memory 401. The bus architecture may also link various other circuits such as peripheral devices, voltage regulators, and power management circuits, which are well known in the art, and therefore are not further described herein. A bus interface provides an interface. The processor 400 is responsible for managing the bus architecture and general processing, and the memory 401 may store the data used when the processor 400 executes operations.

A process disclosed in the embodiments of the present application may be applied to the processor 400 or implemented by the processor 400.

During an implementation process, all steps of a signal processing flow may be completed by an integrated logic circuit of hardware or an instruction in the form of software in the processor 400. The processor 400 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a micro-processor, or any conventional processor, etc. The steps of the method disclosed in conjunction with the embodiment of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 401, and the processor 400 reads information in the memory 401, and completes the steps of the signal processing flow in combination with its hardware.

In one embodiment, the processor 400 is configured to read a program in the memory 401 and execute: selecting, from scheduling information groups configured for a terminal, at least one scheduling information group to be used by the terminal; and instructing, via DCI, the terminal to use the at least one scheduling information group to carry out data transmission in one or more time slots.

In one embodiment, the processor 400 is further configured to: configure a first corresponding relationship between scheduling information groups and scheduling information group indexes for the terminal through high-level signaling; determine a scheduling information group indexes, corresponding to the at least one scheduling information groups, needing to be sent to the terminal according to the first corresponding relationship; and send the determined scheduling information group index to the terminal via the DCI.

In one embodiment, the scheduling information groups in the first corresponding relationship configured for the terminal through the high-level signaling by the processor 400 include: scheduling information groups containing all scheduling information; scheduling information groups containing part of the scheduling information; and scheduling information groups not containing the scheduling information.

In one embodiment, if the scheduling information groups contain part of the scheduling information, remaining scheduling information is pre-defined, or remaining scheduling information is configured in a semi-static manner for the terminal by a network side device through the high-level signaling, or remaining scheduling information is configured dynamically for the terminal by the network side device through physical-layer signaling.

In one embodiment, the processor 400 is further configured to: determine a position index, in the DCI, of a scheduling indication information domain corresponding to a time slots needing to be scheduled according to a second corresponding relationship between position index of the scheduling indication information domain in the DCI and time slot; and send a scheduling information group index corresponding to the time slot to the terminal through the corresponding scheduling indication information domain in the DCI according to the position index.

In one embodiment, the processor 400 is further configured to: configure the second corresponding relationship between position indexes of the scheduling indication information domain in the DCI and time slot for the terminal through the high-level signaling.

In one embodiment, the processor 400 is further configured to: determine a length of the scheduling indication information domain according to a quantity of the scheduling information groups configured for the terminal.

In one embodiment, the processor 400 is further configured to: if the scheduling information group configured for the terminal contains all the scheduling information, directly schedule the scheduling information group carried by a scheduling indication information domain corresponding to the one or more time slots via the DCI; or if the scheduling information groups configured for the terminal contain part of the scheduling information, perform scheduling via the scheduling information group carried by a scheduling indication information domain corresponding to the one or more time slot configured for the terminal in the DCI and remaining scheduling information configured for the terminal through the high-level signaling; or if the scheduling information group configured for the terminal contains part of the scheduling information, perform scheduling via the scheduling information groups carried by a scheduling indication information domain corresponding to the one or more time slots configured for the terminal in the DCI and remaining scheduling information dynamically indicated in the DCI.

In one embodiment, the processor 400 is further configured to notify the terminal that the payload size of the DCI used for the scheduling information groups is the same as that of a DCI format 0-0, or a DCI format 1-0, or a DCI format 0-1 or a DCI format 1-1; or the processor 400 is further configured to notify the terminal that a payload size of the DCI used for the scheduling information groups is configured for the terminal by the network side device through high-level signaling.

In one embodiment, the processor 400 is further configured to: notify the terminal that the received DCI is DCI configured to schedule data transmission in time slots through at least one of following manners: scrambling the DCI configured to schedule data transmission in the plurality of time slots through a first RNTI; carrying information representing a DCI type in the DCI configured to schedule data transmission in the plurality of time slots; sending the DCI configured to schedule data transmission in the plurality of time slots in a specific search space; carrying information representing a DCI type on frozen bits; or setting part of bits in the DCI configured to schedule data transmission in the plurality of time slots to be special values.

As shown in FIG. 5, a second time slot scheduling device of an embodiment of the present application is provided. The device includes a processor 500, a memory 501 and a transceiver 502.

The processor 500 is responsible for managing the bus architecture and general processing, and the memory 501 may store the data used when the processor 500 executes operations. The transceiver 502 is configured to receive and send data under the control of the processor 500.

The bus architecture may include interconnected buses of any number and bridges of any number, which are specifically linked together through various circuits of one or more processors represented by the processor 500 and various circuits of memories represented by the memory 501. The bus architecture may also link various other circuits such as peripheral devices, voltage regulators, and power management circuits, which are well known in the art, and therefore are not further described herein. A bus interface provides an interface. The processor 500 is responsible for managing the bus architecture and general processing, and the memory 501 may store the data used when the processor 500 executes operations.

A process disclosed in the embodiments of the present application may be applied to the processor 500 or implemented by the processor 500. During an implementation process, all steps of a signal processing flow may be completed by an integrated logic circuit of hardware or an instruction in the form of software in the processor 500. The processor 500 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, or any conventional processor, etc. The steps of the method disclosed in conjunction with the embodiment of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 501, and the processor 500 reads information in the memory 501, and completes the steps of the signal processing flow in combination with its hardware.

In one embodiment, the processor 500 is configured to read a program in the memory 501 and execute: receiving at least one scheduling information group instructed by a network side device for the terminal via DCI; and carrying out data transmission in one or more time slots by using the at least one scheduling information group.

The at least one scheduling information group is selected by the network side device from scheduling information groups configured for a terminal.

In one embodiment, the processor 500 is further configured to: receive a first corresponding relationship configured by the network side device via high-level signaling between scheduling information groups and scheduling information group indexes; and receive a scheduling information group index sent by the network side device via DCI.

The scheduling information group index is a scheduling information group index, determined by the network side device according to the first corresponding relationship and needs to be sent to the terminal, corresponding to the at least one scheduling information group.

In one embodiment, the scheduling information groups in the first corresponding relationship configured by the network side device via the high-level signaling and received by the processor 500, between scheduling information groups and scheduling information group indexes include: one or more scheduling information groups containing all scheduling information; one or more scheduling information groups containing part of the scheduling information; and one or more scheduling information groups not containing the scheduling information.

In one embodiment, if the scheduling information groups contain part of the scheduling information, remaining scheduling information is pre-defined, or remaining scheduling information is configured in a semi-static manner for the terminal by the network side device through the high-level signaling, or remaining scheduling information is configured dynamically for the terminal by the network side device through physical-layer signaling.

In one embodiment, the processor 500 is further configured to: obtain a scheduling information group index, sent by the network side device, corresponding to a time slot through a corresponding scheduling indication information domain in the DCI.

The scheduling indication information domain is determined by the network side device according to a position index, in the DCI, of the scheduling indication information domain corresponding to the time slot needing to be scheduled in a second corresponding relationship between position indexes of scheduling indication information domains in the DCI and time slots.

In one embodiment, the processor 500 is further configured to: receive the second corresponding relationship, carried by the high-level signaling and configured for the terminal by the network side device, between position indexes of scheduling indication information domains in the DCI and time slots.

In one embodiment, the payload size of the DCI used for the scheduling information groups notified by the network side device and received by the processor is the same as that of a DCI format 0-0, or a DCI format 1-0, or a DCI format 0-1 or a DCI format 1-1; or a payload size of the DCI used for the scheduling information groups notified by the network side device and specifically received by the processor is configured for the terminal by the network side device through the high-level signaling.

In one embodiment, the processor 500 is further configured to: determine that the DCI sent by the network side device is DCI configured to schedule data transmission in time slots through at least one of following manners: determining that the DCI sent by the network side device is DCI scrambled through a first RNTI; determining that the DCI sent by the network side device carries information representing a DCI type; determining that the DCI sent by the network side device carries information representing a DCI type on frozen bits; receiving the DCI configured to schedule data transmission in the plurality of time slots in a specific search space; or determining that part of bits in the DCI sent by the network side device are predetermined values.

As shown in FIG. 6, which is a schematic structural diagram of a third time slot scheduling device provided by an embodiment of the present application, the device includes: a selecting device 600 and an instructing device 610.

The selecting device 600 is configured to: select, from scheduling information groups configured for a terminal, at least one scheduling information group to be used by the terminal.

The instructing device 610 is configured to: instruct, via DCI, the terminal to use the at least one scheduling information group to carry out data transmission in one or more time slots.

In one embodiment, the selecting device 600 is further configured to: configure a first corresponding relationship between scheduling information groups and scheduling information group indexes for the terminal through high-level signaling.

In one embodiment, the instructing device 610 is further configured to: determine a scheduling information group index, corresponding to the at least one scheduling information group, needing to be sent to the terminal according to the first corresponding relationship; and send the determined scheduling information group indexes to the terminal via the DCI.

In one embodiment, the scheduling information groups in the first corresponding relationship include: scheduling information groups containing all scheduling information; scheduling information groups containing part of the scheduling information; and scheduling information groups not containing the scheduling information.

In one embodiment, if the scheduling information groups contain part of the scheduling information, remaining scheduling information is pre-defined, or the remaining scheduling information is configured in a semi-static manner for the terminal by a network side device through the high-level signaling, or the remaining scheduling information is configured dynamically for the terminal by the network side device through physical-layer signaling.

In one embodiment, the instructing device 610 is further configured to: determine position indexes, in the DCI, of scheduling indication information domains corresponding to time slots needing to be scheduled according to a second corresponding relationship between position indexes of scheduling indication information domains in the DCI and the time slots; and send the scheduling information group indexes corresponding to the time slots to the terminal through the corresponding scheduling indication information domains in the DCI according to the position indexes.

In one embodiment, the instructing device 610 is further configured to: configure the second corresponding relationship between position indexes of scheduling indication information domains in the DCI and time slots for the terminal through the high-level signaling.

In one embodiment, the device further includes a determining device which is configured to: determine a length of the scheduling indication information domains according to the number of the scheduling information groups configured for the terminal.

In one embodiment, the instructing device 610 is further configured to: if the scheduling information groups configured for the terminal contain all the scheduling information, directly schedule the scheduling information groups carried by the scheduling indication information domains corresponding to the time slots via the DCI; or if the scheduling information groups configured for the terminal contain part of the scheduling information, perform scheduling via the scheduling information groups carried by scheduling indication information domains corresponding to the time slots configured for the terminal in the DCI and remaining scheduling information configured for the terminal through the high-level signaling; or if the scheduling information groups configured for the terminal contain part of the scheduling information, perform scheduling via the scheduling information groups carried by the scheduling indication information domains corresponding to the time slots configured for the terminal in the DCI and the remaining scheduling information dynamically indicated in the DCI.

In one embodiment, the terminal is notified that the payload size of the DCI used for the scheduling information groups is the same as that of a DCI format 0-0, or a DCI format 1-0, or a DCI format 0-1 or a DCI format 1-1; or the terminal is notified that a payload size of the DCI used for the scheduling information groups is configured for the terminal by the network side device through the high-level signaling.

In one embodiment, the terminal is notified that the received DCI is DCI configured to schedule data transmission in time slots through at least one of the following manners: scrambling the DCI configured to schedule data transmission in the plurality of time slots through a first RNTI; carrying information representing a DCI type is carried in the DCI configured to schedule data transmission in the plurality of time slots; sending the DCI configured to schedule data transmission in the plurality of time slots in a specific search space; carrying information representing a DCI type on frozen bits; or setting part of bits in the DCI configured to schedule data transmission in the plurality of time slots to be predetermined values.

As shown in FIG. 7, which is a schematic structural diagram of a fourth time slot scheduling device provided by an embodiment of the present application, the device includes: a receiving device 700 and a transmitting device 710.

The receiving device 700 is configured to: receive at least one scheduling information group instructed by a network side device for the terminal via DCI.

The transmitting device 710 is configured to: carry out data transmission in one or more time slots by using the at least one scheduling information group.

The at least one scheduling information group is selected by the network side device from scheduling information groups configured for a terminal.

In one embodiment, the receiving device 700 is further configured to: receive a first corresponding relationship configured by the network side device via high-level signaling between scheduling information groups and scheduling information group indexes.

The receiving device 700 is further configured to: receive a scheduling information group index sent by the network side device via the DCI.

The scheduling information group index is scheduling information group index, which is determined by the network side device according to the first corresponding relationship and needs to be sent to the terminal, corresponding to the at least one scheduling information group.

In one embodiment, the scheduling information groups in the first corresponding relationship configured by the network side device via the high-level signaling and received by the receiving device 700, between scheduling information groups and scheduling information group indexes include: a scheduling information group containing all scheduling information; a scheduling information group containing part of the scheduling information; and a scheduling information group not containing the scheduling information.

In one embodiment, if the scheduling information groups contain part of the scheduling information, remaining scheduling information is pre-defined, or remaining scheduling information is configured in a semi-static manner for the terminal by the network side device through the high-level signaling, or remaining scheduling information is configured dynamically for the terminal by the network side device through physical-layer signaling.

In one embodiment, the receiving device 700 is further configured to: obtain a scheduling information group index, sent by the network side device, corresponding to a time slot through a scheduling indication information domain in the DCI corresponding to the time slot.

The scheduling indication information domain is determined by the network side device according to a position index, in the DCI, of the scheduling indication information domain corresponding to the time slot needing to be scheduled in a second corresponding relationship between position indexes of the scheduling indication information domains in the DCI and time slots.

In one embodiment, the receiving device 700 is further configured to: receive the second corresponding relationship, carried by the high-level signaling and configured for the terminal by the network side device, between position indexes of scheduling indication information domains in the DCI and the time slots.

In one embodiment, a payload size, notified by the network side device and received by the receiving device 700, of the DCI used for the scheduling information group is the same as that of a DCI format 0-0, or a DCI format 1-0, or a DCI format 0-1 or a DCI format 1-1; or a payload size of the received DCI used for the scheduling information group notified by the network side device is configured for the terminal by the network side device through the high-level signaling.

In one embodiment, it is determined that the DCI sent by the network side device is DCI configured to schedule data transmission in time slots through at least one of the following manners: it is determined that the DCI sent by the network side device is DCI scrambled through a first RNTI; it is determined that the DCI sent by the network side device carries information representing the DCI type; it is determined that the DCI sent by the network side device carries information representing the DCI type on frozen bits; the DCI configured to schedule data transmission in the plurality of time slots is received in a specific search space; or it is determined that part of bits in the DCI sent by the network side device are predetermined values.

Based on the same inventive concept, an embodiment of the present application further provides a time slot scheduling method. Since the method corresponds to the method corresponding to the time slot scheduling device in the embodiments of the present application, and a principle for solving problems of the method is similar to that of the device, implementation of this method may be referred to implementation of the device, for which, repetition is no longer repeated here.

As shown in FIG. 8, which is a flow diagram of a time slot scheduling method provided by an embodiment of the present application, the method includes the following steps.

Step 800, a network side device selects, from scheduling information groups configured for a terminal, at least one scheduling information group to be used by the terminal.

Step 810, the network side device instructs, via DCI, the terminal to use the at least one scheduling information group to carry out data transmission in one or more time slots.

In one embodiment, before the network side device selects, from the plurality of scheduling information groups configured for the terminal, the at least one scheduling information group to be used by the terminal, the method further includes: the network side device configures a first corresponding relationship between scheduling information groups and scheduling information group indexes for the terminal through high-level signaling.

Instructing, by the network side device, via the DCI, the terminal to use the at least one scheduling information group to carry out data transmission in the one or more time slots includes: the network side device determines a scheduling information group index, corresponding to the at least one scheduling information group, needing to be sent to the terminal according to the first corresponding relationship; and the network side device sends the determined scheduling information group index to the terminal via the DCI.

In one embodiment, the scheduling information groups in the first corresponding relationship configured for the terminal by the network side device through the high-level signaling include: one or more scheduling information groups containing all scheduling information; one or more scheduling information groups containing part of the scheduling information; and one or more scheduling information groups not containing the scheduling information.

In one embodiment, if the scheduling information groups contain part of the scheduling information, remaining scheduling information is pre-defined, or remaining scheduling information is configured in a semi-static manner for the terminal by a network side device through the high-level signaling, or remaining scheduling information is configured dynamically for the terminal by the network side device through physical-layer signaling.

In one embodiment, the instructing, by the network side device, via the DCI, the terminal to use the at least one scheduling information group to carry out data transmission in the one or more time slots includes: the network side device determines a position index, in the DCI, of a scheduling indication information domain corresponding to a time slot needing to be scheduled according to a second corresponding relationship between position indexes of scheduling indication information domains in the DCI and time slots; and the network side device sends a scheduling information group index corresponding to the time slot to the terminal through the corresponding scheduling indication information domain in the DCI according to the position index.

In one embodiment, before the network side device instructs, via the DCI, the terminal to use the at least one scheduling information group to carry out data transmission, the method further includes: the network side device configures the second corresponding relationship between position indexes of scheduling indication information domains in the DCI and time slots for the terminal through the high-level signaling.

In one embodiment, the method further includes: the network side device determines a length of the scheduling indication information domains according to the number of the scheduling information groups configured for the terminal.

In one embodiment, instructing, by the network side device, via the DCI, the terminal to use the at least one scheduling information group to carry out data transmission in the one or more time slots includes: if the scheduling information group configured for the terminal contains all the scheduling information, the network side device directly schedules the scheduling information groups carried by a scheduling indication information domain corresponding to the one or more time slots via the DCI; or when the scheduling information group configured for the terminal contains part of the scheduling information, the network side device performs scheduling via the scheduling information group carried by a scheduling indication information domain corresponding to the one or more time slots configured for the terminal in the DCI and remaining scheduling information configured for the terminal through the high-level signaling; or if the scheduling information groups configured for the terminal contain part of the scheduling information, the network side device performs scheduling via the scheduling information groups carried by a scheduling indication information domain corresponding to the one or more time slots configured for the terminal in the DCI and remaining scheduling information dynamically indicated in the DCI.

In one embodiment, the network side device notifies the terminal that a payload size of the DCI used for the scheduling information group is the same as that of a DCI format 0-0, or a DCI format 1-0, or a DCI format 0-1 or a DCI format 1-1; or the network side device notifies the terminal that a payload size of the DCI used for the scheduling information group is configured for the terminal by the network side device through high-level signaling.

In one embodiment, the network side device notifies the terminal that the received DCI is DCI configured to schedule data transmission in time slots through at least one of the following manners: the network side device scrambles the DCI configured to schedule data transmission in the plurality of time slots through a first RNTI; the network side device carries information representing the DCI type in the DCI configured to schedule data transmission in the plurality of time slots; the network side device sends the DCI configured to schedule data transmission in the plurality of time slots in a specific search space; the network side device carries information representing the DCI type on frozen bits; or the network side device sets part of bits in the DCI configured to schedule data transmission in the plurality of time slots to be predetermined values.

Based on the same inventive concept, an embodiment of the present application further provides another time slot scheduling method. Since the method corresponds to the method corresponding to the time slot scheduling device in the embodiments of the present application, and a principle for solving problems of the method is similar to that of the device, implementation of this method may be referred to implementation of the device, for which, repetition is no longer repeated here.

As shown in FIG. 9, which is a flow diagram of another time slot scheduling method provided by an embodiment of the present application, the method specifically includes the following steps.

Step 900, a terminal receives at least one scheduling information group instructed by a network side device for the terminal via DCI.

Step 910, the terminal carries out data transmission in one or more time slots by using the at least one scheduling information group.

The at least one scheduling information group is selected by the network side device from scheduling information groups configured for the terminal.

In one embodiment, before the terminal receives the at least one scheduling information group instructed by the network side device for the terminal via DCI, the method further includes: the terminal receives a first corresponding relationship configured by the network side device via high-level signaling between scheduling information groups and scheduling information group indexes.

Receiving, by the terminal, the at least one scheduling information group instructed by the network side device for the terminal via the DCI includes: the terminal receives a scheduling information group index sent by the network side device via the DCI.

The scheduling information group index is a scheduling information group index, which is determined by the network side device according to the first corresponding relationship and needs to be sent to the terminal, corresponding to the at least one scheduling information group.

In one embodiment, the scheduling information groups in the first corresponding relationship configured by the network side device via the high-level signaling and received by the terminal, between scheduling information groups and scheduling information group indexes include: one or more scheduling information groups containing all scheduling information; one or more scheduling information groups containing part of the scheduling information; and one or more scheduling information groups not containing the scheduling information.

In one embodiment, if the scheduling information group contains part of the scheduling information, remaining scheduling information is pre-defined, or remaining scheduling information is configured in a semi-static manner for the terminal by the network side device through the high-level signaling, or remaining scheduling information is configured dynamically for the terminal by the network side device through physical-layer signaling.

In one embodiment, receiving, by the terminal, the at least one scheduling information group instructed by the network side device for the terminal via the DCI includes: the terminal obtains a scheduling information group index, sent by the network side device, corresponding to a time slot through a scheduling indication information domain in the DCI corresponding to the time slot.

The scheduling indication information domain is determined by the network side device according to a position index, in the DCI, of the scheduling indication information domain corresponding to the time slot needing to be scheduled in a second corresponding relationship between position indexes of scheduling indication information domains in the DCI and time slots.

In one embodiment, before the terminal receives the at least one scheduling information group instructed by the network side device for the terminal via the DCI, the method further includes: the terminal receives the second corresponding relationship, carried by the high-level signaling and configured for the terminal by the network side device, between position indexes of scheduling indication information domains in the DCI and time slots.

In one embodiment, a payload size, notified by the network side device and received by the terminal, of the DCI used for the scheduling information groups is the same as that of a DCI format 0-0, or a DCI format 1-0, or a DCI format 0-1 or a DCI format 1-1; or a payload size, notified by the network side device and received by the terminal, of the DCI used for the scheduling information groups is configured for the terminal by the network side device through the high-level signaling.

In one embodiment, the terminal determines that the DCI sent by the network side device is DCI configured to schedule data transmission in time slots through at least one of the following manners: the terminal determines that the DCI sent by the network side device is DCI scrambled through the first RNTI; the terminal determines that the DCI sent by the network side device carries information representing the DCI type; the terminal determines that the DCI sent by the network side device carries information representing the DCI type on the frozen bits; the terminal receives the DCI configured to schedule data transmission in the plurality of time slots in a specific search space; or the terminal determines that part of bits in the DCI sent by the network side device are predetermined values.

A computer readable storage medium stores a computer program, and the program, when executed by a processor, implements the steps of the method described in FIG. 8, or the steps of the method described in FIG. 9.

The present application is described above with reference to block diagrams and/or flow diagrams of methods, apparatuses (systems) and/or computer program products according to the embodiments of the present application. It should be understood that a block of the block diagrams and/or flow diagrams and a combination of blocks of the block diagrams and/or the flow diagrams can be implemented by computer program instructions. These computer program instructions may be provided for a processor of a general-purpose computer and a special-purpose computer and/or other programmable data processing apparatuses to produce a machine, so that instructions executed by the processor of the computer and/or other programmable data processing apparatuses create a method for implementing a function/action specified in blocks of the block diagrams and/or flow diagrams.

Correspondingly, the present application may be further implemented through hardware and/or software (including firmware, resident software, microcodes, etc.). Further, the present application may take the form of a computer program product on a computer usable or computer readable storage medium having computer usable or computer readable program codes implemented in the medium for use by or in combination with an instruction execution system. In the context of the present application, a computer usable or computer-readable medium may be any medium that may contain, store, communicate, transmit, or convey a program for use by, or in combination with, an instruction execution system, apparatus, or device.

What is claimed is:

1. A time slot scheduling method based on Downlink Control Information (DCI), comprising:

configuring, by a network side device, a first corresponding relationship between scheduling information groups and scheduling information group indexes for a terminal through high-level signaling;

selecting, by the network side device, from a plurality of scheduling information groups configured for the terminal, at least one scheduling information group to be used by the terminal;

determining, by the network side device, a scheduling information group index corresponding to the at least one scheduling information group to be used by the terminal according to the first corresponding relationship;

configuring, by the network side device, a second corresponding relationship between position indexes of scheduling indication information domains in one DCI and time slots for the terminal through high-level signaling;

determining, by the network side device, a position index, in the one DCI, of a scheduling indication information domain corresponding to a time slot needing to be scheduled according to the second corresponding relationship; and sending, by the network side device, a scheduling information group index corresponding to the time slot to the terminal through the corresponding scheduling indication information domain in the one DCI according to the position index;

wherein the scheduling information group indexes are determined according to a quantity of the scheduling information groups configured for the terminal by the network side device; wherein the scheduling information groups in the first corresponding relationship configured for the terminal by the network side device through high-level signaling comprises:

a scheduling information group containing all scheduling information; and a scheduling information group containing part of the scheduling information;

wherein the scheduling information comprises time domain resource distribution information; the DCI is configured to schedule data transmission in a plurality of time slots, and the scheduling information at least indicates time domain resource distribution information used by the terminal in each of the plurality of time slots.

2. The method according to claim 1, wherein when the scheduling information group contains part of the scheduling information, remaining scheduling information is predefined, or remaining scheduling information is configured in a semi-static manner for the terminal by the network side device through the high-level signaling, or remaining scheduling information is configured dynamically for the terminal by the network side device through physical-layer signaling.

3. The method according to claim 1, further comprising:

determining, by the network side device, a length of the scheduling indication information domain according to the quantity of the scheduling information groups configured for the terminal.

4. The method according to claim 1, wherein when the scheduling information group configured for the terminal contains all the scheduling information, directly scheduling, by the network side device, the scheduling information group carried by a scheduling indication information domain corresponding to the plurality of time slots via the one DCI; or when the scheduling information group configured for the terminal contains part of the scheduling information, performing, by the network side device, scheduling via the scheduling information group carried by a scheduling indication information domain corresponding to the plurality of time slots configured for the terminal in the one DCI and via remaining scheduling information configured for the terminal through the high-level signaling; or when the scheduling information group configured for the terminal contains part of the scheduling information, performing, by the network side device, scheduling via the scheduling information group carried by a scheduling indication information domain corresponding to the plurality of time slots configured for the terminal in the one DCI and via remaining scheduling information dynamically indicated in the one DCI.

5. The method according to claim 1, wherein the network side device notifies the terminal that a payload size of the one DCI used for the scheduling information group is the same as one or more of: a DCI format 0-0, a DCI format 1-0, a DCI format 0-1, or a DCI format 1-1; or the network side device notifies the terminal that a payload size of the one DCI used for the at least one scheduling information group is configured for the terminal by the network side device through high-level signaling.

6. The method according to claim 1, wherein the network side device notifies the terminal that the received DCI is the one DCI configured to schedule data transmission in the plurality of time slots through at least one of following manners:

scrambling, by the network side device, the DCI configured to schedule data transmission in the plurality of time slots through a first Radio Network Temporary Identity (RNTI);

carrying, by the network side device, information representing a DCI type in the DCI configured to schedule data transmission in the plurality of time slots;

sending, by the network side device, the one DCI configured to schedule data transmission in the plurality of time slots in a specific search space;

carrying, by the network side device, information representing a DCI type on frozen bits; or setting, by the network side device, part of bits in the one DCI configured to schedule data transmission in the plurality of time slots to be predetermined values.

7. A time slot scheduling method based on Downlink Control Information (DCI), comprising:

receiving, by a terminal, a first corresponding relationship configured by a network side device via high-level signaling between scheduling information groups and scheduling information group indexes; receiving, by the terminal, a scheduling information group index sent by the network side device via one DCI; and determining, by the terminal, at least one scheduling information group indicated by the scheduling information group index;

wherein the scheduling information group index is a scheduling information group index, corresponding to at least one scheduling information group, determined by the network side device according to the first corresponding relationship, and the at least one scheduling information group is selected by the network side device from a plurality of scheduling information groups configured for the terminal; wherein the scheduling information group index is determined according to a quantity of scheduling information groups configured for the terminal by the network side device; wherein the scheduling information groups in the first corresponding relationship configured for the terminal by the network side device through high- level signaling comprises: a scheduling information group containing all scheduling information; and a scheduling information group containing part of the scheduling information; wherein the scheduling information comprises time domain resource distribution information; the DCI is configured to schedule data transmission in a plurality of time slots, and the scheduling information at least indicates time domain resource distribution information used by the terminal in each of the plurality of time slots;

wherein the scheduling information group index is sent by the network side device, corresponding to a time slot through a scheduling indication information domain, in the one DCI, corresponding to the time slot; and the scheduling indication information domain is determined by the network side device according to a position index, in the one DCI, of the scheduling indication information domain corresponding to the time slot needing to be scheduled in a second corresponding relationship between position indexes of scheduling indication information domains in the one DCI and time slots; and carrying out, by the terminal, data transmission in the plurality of time slots by using the at least one scheduling information group.

8. The method according to claim 7, wherein when the at least one scheduling information group contains part of the scheduling information, remaining scheduling information is pre-defined, or remaining scheduling information is configured in a semi-static manner for the terminal by the network side device through the high-level signaling, or remaining scheduling information is configured dynamically for the terminal by the network side device through physical-layer signaling.

9. The method according to claim 7, wherein before the receiving, by the terminal, the at least one scheduling information group instructed by the network side device for the terminal via the one DCI, the method further comprises:

receiving, by the terminal, the second corresponding relationship, carried by high-level signaling and configured for the terminal by the network side device, between position indexes of scheduling indication information domains in the one DCI and time slots.

10. The method according to claim 7, wherein a payload size, notified by the network side device and received by the terminal, of the one DCI used for the scheduling information group is the same as one or more of: a DCI format 0-0, a DCI format 1-0, a DCI format 0-1, or a DCI format 1-1; or a payload size, notified by the network side device and received by the terminal, of the DCI used for the scheduling information group is configured for the terminal by the network side device through high-level signaling.

11. The method according to claim 7, wherein the terminal determines that the DCI sent by the network side device is the one DCI configured to schedule data transmission in the plurality of time slots through at least one of following manners:

determining, by the terminal, that the DCI sent by the network side device is DCI scrambled through a first RNTI;

determining, by the terminal, that the DCI sent by the network side device carries information representing a DCI type;

determining, by the terminal, that the DCI sent by the network side device carries information representing a DCI type on frozen bits;

receiving, by the terminal, the DCI configured to schedule data transmission in the plurality of time slots in a specific search space; or determining, by the terminal, that part of bits in the DCI sent by the network side device are predetermined values.

12. A device for time slot scheduling based on Downlink Control Information (DCI), comprising a processor, a memory and a transceiver;

wherein the processor is configured to read a program in the memory and execute:

configuring a first corresponding relationship between scheduling information groups and scheduling information group indexes for a terminal through high-level signaling;

selecting, from a plurality of scheduling information groups configured for the terminal, at least one scheduling information group to be used by the terminal;

determining a scheduling information group index corresponding to the at least one scheduling information group to be used by the terminal according to the first corresponding relationship;

configuring a second corresponding relationship between position indexes of scheduling indication information domains in one DCI and time slots for the terminal through high-level signaling;

determining a position index, in the one DCI, of a scheduling indication information domain corresponding to a time slot needing to be scheduled according to the second corresponding relationship; and sending a scheduling information group index corresponding to the time slot to the terminal through the corresponding scheduling indication information domain in the one DCI according to the position index;

wherein the scheduling information group indexes are determined according to a quantity of the scheduling information groups configured for the terminal by the network side device;

wherein the scheduling information groups in the first corresponding relationship configured for the terminal by the network side device through high-level signaling comprises:

a scheduling information group containing all scheduling information; and a scheduling information group containing part of the scheduling information;

wherein the scheduling information comprises time domain resource distribution information; the DCI is configured to schedule data transmission in a plurality of time slots, and the scheduling information at least indicates time domain resource distribution information used by the terminal in each of the plurality of time slots.

13. A device for time slot scheduling based on Downlink Control Information (DCI), comprising a processor, a memory and a transceiver;

wherein the processor is configured to read a program in the memory and execute the method of claim 7.

* * * * *